United States Patent
Moser et al.

(10) Patent No.: US 9,371,843 B2
(45) Date of Patent: Jun. 21, 2016

(54) FAILSAFE PILOT SUPPLY SELECTOR VALVE

(71) Applicant: Caterpillar Inc., Peoria, IL (US)

(72) Inventors: Paul Moser, Peoria, IL (US); Jeffrey Allan Digby, Pekin, IL (US); Dennis Ray Barber, Plainfield, IL (US); Wendell D. Stahl, Bradford, IL (US)

(73) Assignee: Caterpillar Inc., Peoria, IL (US)

( * ) Notice: Subject to any disclaimer, the term of this patent is extended or adjusted under 35 U.S.C. 154(b) by 146 days.

(21) Appl. No.: 14/155,074

(22) Filed: Jan. 14, 2014

(65) Prior Publication Data

US 2015/0198183 A1 Jul. 16, 2015

(51) Int. Cl.
| | |
|---|---|
| F16K 11/07 | (2006.01) |
| F15B 13/06 | (2006.01) |
| F15B 20/00 | (2006.01) |
| F16K 31/06 | (2006.01) |

(52) U.S. Cl.
CPC .............. *F15B 13/06* (2013.01); *F15B 20/00* (2013.01); *F16K 11/07* (2013.01); *F16K 31/0613* (2013.01); *F15B 2211/20576* (2013.01); *F15B 2211/41518* (2013.01); *F15B 2211/635* (2013.01); *F15B 2211/67* (2013.01); *F15B 2211/8626* (2013.01); *F15B 2211/8636* (2013.01); *F15B 2211/8757* (2013.01); *Y10T 137/0318* (2015.04); *Y10T 137/86574* (2015.04); *Y10T 137/86622* (2015.04)

(58) Field of Classification Search
CPC .. F15B 11/166; F15B 13/022; F15B 13/0402; F15B 13/06; Y10T 137/86614
USPC .............. 137/625.64, 625.65, 625.67, 625.69
See application file for complete search history.

(56) References Cited

U.S. PATENT DOCUMENTS

| | | | | |
|---|---|---|---|---|
| 4,883,092 A | * | 11/1989 | Rub ................... | F15B 13/0402 137/625.65 |
| 4,924,902 A | * | 5/1990 | Lewis ................. | F15B 13/0402 137/270 |
| 5,647,211 A | | 7/1997 | Harber et al. | |
| 6,095,187 A | | 8/2000 | Hotchkiss | |
| 6,293,181 B1 | | 9/2001 | Hajek, Jr. | |
| 6,755,214 B2 | | 6/2004 | Bento | |
| 2004/0000228 A1 | | 1/2004 | A Hearn et al. | |

FOREIGN PATENT DOCUMENTS

| | | |
|---|---|---|
| DE | 203 20 201 U1 | 5/2004 |
| EP | 1172565 | 1/2002 |

\* cited by examiner

*Primary Examiner* — Craig Schneider
*Assistant Examiner* — Reinaldo Sanchez-Medina
(74) *Attorney, Agent, or Firm* — Edward Lin

(57) ABSTRACT

A failsafe pilot selector valve may include at least one inlet port, a first outlet port, a second outlet port, and a biasing element. The failsafe pilot selector valve may have a first end position with the at least one inlet port in fluid communication with the first outlet port, a second end position with the at least one inlet port in fluid communication with the first outlet port, and an intermediate position between the first end position and the second end position with the at least one inlet port in fluid communication with the second outlet port. The biasing element may provide a biasing force to move the failsafe pilot selector valve to the first end position. The pilot selector valve can alternately provide pilot fluid to primary and redundant control elements of a redundantly controlled system in fluid communication with the outlet ports.

11 Claims, 9 Drawing Sheets

FAILSAFE PILOT SUPPLY SELECTOR VALVE

TECHNICAL FIELD

This disclosure relates generally to redundant control in electro-pneumatic and electro-hydraulic systems and, in particular, to methods and apparatus for failsafe operation of a pilot selector valve for redundantly controlled electro-pneumatic and electro-hydraulic systems.

BACKGROUND

Systems, such as electronic, electro-pneumatic and electro-hydraulic steering and braking systems, are currently implemented in vehicles and other machinery and equipment to take advantage of their versatility over purely mechanical, pneumatic and hydraulic systems. Such control systems commonly use pneumatic or hydraulic power as the muscle for the actual steering and breaking functions, and electrical components as the command for the precision control of the pneumatic and hydraulic components. These control systems are particularly advantageous in excavating machines where the hydraulic power is necessary to move the steering and braking components of the machine, as well as the excavating components. In the event of performance issues or failure of the primary electronic, electro-pneumatic or electro-hydraulic control systems, redundant control systems are typically implemented in concert with the primary systems to take over control of the controlled components of the machine when necessary.

In one exemplary arrangement, a redundantly controlled system may include a primary pilot control valve and a secondary or redundant pilot control valve that are used to control a main valve spool in the redundantly controlled system that can be, for example, a braking or steering system. These systems further include a pilot selector valve that directs pressurized pilot fluid to the primary and secondary pilot control valves depending on whether the primary control portion is operated or the redundant control portion is operating. In many previous implementations, the pilot selector valve is a simple on/off valve. Typically, a 100% electrical signal to the actuator of the pilot selector valve causes the pilot fluid to be provided to the primary pilot control valve, and a 0% electrical signal causes the pilot fluid to be provided to the redundant pilot control valve.

The operation of the controlled system and at the pilot selector valve may be controlled by one or both of a primary electronic control module (ECM) and a secondary or redundant ECM. During normal operation, the primary ECM may operate to perform control of the components of the redundantly controlled system, and one of the ECM's transmits signals to the actuator of the pilot selector valve to direct pilot fluid to the primary pilot control valve. Upon detection of a fault condition in the primary control components or the primary ECM, the redundant ECM assumes control of the redundantly controlled system and transmits signals to the actuator of the pilot selector valve, or omits transmitting signals to the actuator, to cause the pilot selector valve to direct pilot fluid to the redundant pilot control valve.

Despite this design, it is possible for conditions to exist where the primary and redundant ECM's do not function properly to perform either the primary or redundant control strategies. For example, the redundant ECM may attempt to assume control due to a false positive detection of a fault in the primary control elements, and expect the pilot fluid to be delivered by the pilot selector valve to the secondary pilot control valve. If the primary ECM continues to perform its control functions, signals from the primary ECM will cause the primary control elements to attempt to perform the primary control strategy while the redundant ECM transmits control signals to the secondary control elements of the controlled system to attempt to perform the primary control strategy. In previous systems, mechanisms do not exist to detect the occurrence of these types of errors by the ECM's and reestablish proper control of the controlled system. In view of this, a need exists for methods and apparatus for failsafe operation of a pilot selector valve and control of the components of the redundantly controlled system.

SUMMARY OF THE DISCLOSURE

In one aspect of the present disclosure, a failsafe pilot selector valve is disclosed. The failsafe pilot selector valve may include at least one inlet port, a first outlet port, a second outlet port, and a biasing element. The failsafe pilot selector valve may have a first end position with the at least one inlet port in fluid communication with the first outlet port, a second end position with the at least one inlet port in fluid communication with the first outlet port, and an intermediate position between the first end position and the second end position with the at least one inlet port in fluid communication with the second outlet port. The biasing element may provide a biasing force to move the failsafe pilot selector valve to the first end position.

In another aspect of the present disclosure, a machine is disclosed. The machine may include a redundantly controlled system having a primary control element and a secondary control element, at least one pilot supply source outputting a pressurized pilot fluid, a failsafe pilot selector valve, and a valve actuator operatively connected to the failsafe pilot selector valve. The failsafe pilot selector valve may include at least one inlet port fluidly connected to the at least one pilot supply source, a first outlet port fluidly connected to the primary control element, a second outlet port fluidly connected to the secondary control element, and a biasing element. The failsafe pilot selector valve may have a first end position with the at least one inlet port in fluid communication with the first outlet port, a second end position with the at least one inlet port in fluid communication with the first outlet port, and an intermediate position between the first end position and the second end position with the at least one inlet port in fluid communication with the second outlet port. The biasing element may provide a biasing force to move the failsafe pilot selector valve to the first end position. The valve actuator may be operable to move the failsafe pilot selector valve from the first end position to the intermediate position and to the second end position against the biasing force of the biasing element.

In a further aspect of the present disclosure, a method for failsafe operation in a machine of a redundantly controlled system having a primary control element for normal operation and a secondary control element for redundant operation is disclosed. The machine may have a pilot selector valve fluidly connected to the primary control element and the secondary control element wherein the pilot selector valve has a first end position and a second end position wherein the pilot selector valve transmits pressurized pilot fluid to the primary control element, an intermediate position wherein the pilot selector valve transmits the pressurized pilot fluid to the secondary control element. The machine may further include a primary electronic control module controlling the redundantly controlled system during normal operation and a secondary electronic control module controlling the redundantly controlled system during redundant operation. The method for failsafe operation in the machine may include determining whether the secondary electronic control module is performing control of the redundantly controlled system, determining whether a current position of the pilot selector valve is the intermediate position of the pilot selector valve in response to determining that the secondary electronic control module is performing control of the redundantly controlled system, and causing the secondary electronic control module to cease performing control of the redundantly controlled system in response to determining that the current position of the pilot selector valve is not the intermediate position of the pilot selector valve.

Additional aspects are defined by the claims of this patent.

DETAILED DESCRIPTION

Although the following text sets forth a detailed description of numerous different embodiments of the present disclosure, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Figure 1:
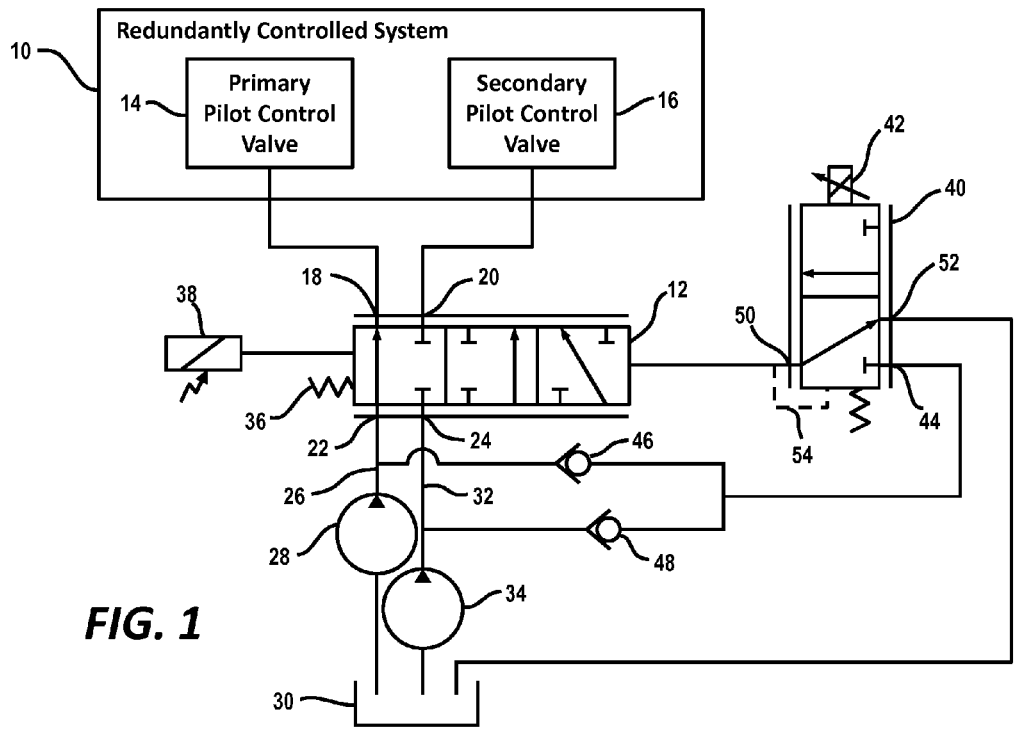
FIG. 1 is a schematic view of an embodiment of a failsafe pilot supply selector valve in accordance with the present disclosure integrated for providing pressurized pilot fluid to a redundantly controlled system.

FIG. 1 illustrates an exemplary redundantly controlled system 10 having pressurized pilot fluid provided thereto by a failsafe pilot selector valve 12 in accordance with the present disclosure. The redundantly controlled system 10 may be an electro-pneumatic or electro-hydraulic system implemented in a vehicle, piece of equipment, excavating machine or the like to perform necessary functions of the vehicle, equipment or machine, such as steering and braking, with redundancy to ensure continuous functioning of the controlled system 10. Hereinafter, the term "machine" may be used to refer generically to any vehicle, equipment, excavating machine or the like having the methods and apparatus of the present disclosure implemented therein. As part of the redundant components of the exemplary system 10, the system 10 may include a primary pilot control valve 14 and a secondary or redundant pilot control valve 16 that may be in fluid communication with a first or primary outlet port 18 and a second, secondary or redundant outlet port 20, respectively, of the pilot selector valve 12 based on the operational position of the pilot selector valve 12. The redundantly controlled system 10 will include additional primary and redundant hydraulic components and electrical components as necessary to perform the functions for which the redundantly controlled system 10 is designed.

In the illustrated embodiment, the pilot selector valve 12 is a 4-way, 3-position valve that alternately places a first or primary inlet port 22 and a second, secondary or redundant inlet port 24 in fluid communication with the outlet ports 18, 20. A primary supply line 26 may place the primary inlet port 22 in fluid communication with a primary pilot supply source or pump 28 that draws pilot fluid from a tank or reservoir 30. Similarly, a secondary supply line 32 may place the secondary inlet port 24 in fluid communication with a secondary pilot supply source or pump 34 that draws pilot fluid from the tank 30 as shown or alternatively from a secondary pilot fluid reservoir. A return spring 36 biases the pilot selector valve 12 to a first end position or 0% position wherein the primary inlet port 22 is placed in fluid communication with the primary outlet port 18, and the secondary inlet port 24 and the secondary outlet port 20 are blocked. In a second end position or 100% position, the secondary inlet port 24 is placed in fluid communication with the primary outlet port 18, and the primary inlet port 22 and the secondary outlet port 20 are capped. In an intermediate position, the secondary inlet port 24 is placed in fluid communication with the secondary outlet port 20 and the primary inlet port 22 and the primary outlet port 18 are blocked. The intermediate position may be between the end positions and may be at a specific valve position or within a range of valve positions at which the inlet ports 22, 24 and the outlet ports 18, 20 are interconnected to produce the required pilot fluid flow depending on the configuration of the pilot selector valve 12. For example, the intermediate position may be at a 50% position of the pilot selector valve 12 with only a small allowable position variance that may require relatively precise control of the valve position. Alternatively, the intermediate position may encompass a range of positions, such as a range of the 30%-70% positions within which the inlet ports 22, 24 and the outlet ports 18, 20 are appropriately interconnected such that precise control of the valve position is not required. Though the 0%, 50% and 100% positions are used in reference to the first end position, the intermediate position and the second end position, respectively, in the following examples, those skilled in the art will understand that the examples apply equally for pilot selector valves 12 having end positions and intermediate positions at other positions or ranges of positions. The position of the pilot selector valve 12 may be monitored by a selector position sensor 38 operatively connected thereto and providing feedback for a control strategy as discussed further below.

The position of the pilot selector valve 12 may be controlled by any appropriate valve actuator mechanism, such as by a solenoid actuator, a pressurized air or fluid signal, or the like, so that the pilot selector valve 12 provides pilot fluid to either the primary control elements or the redundant control elements to maintain pilot pressure in the redundantly controlled system 10 and prevent loss of control over the system 10. In the present embodiment, a proportional selector control valve 40 provides a signal of pressurized pilot fluid to an end of the pilot selector valve 12 opposite the return spring 36 to move the valve spool of the pilot selector valve 12 against the force of the return spring 36. The selector control valve 40 may be a 3-way, 2-position normally closed valve with a spring return, with the position of the selector control valve 40 being controlled by a solenoid actuator 42 in a manner discussed further below. The selector control valve 40 has an inlet port 44 alternately placed in fluid communication with the pilot supply pumps 28, 34 by a first check valve 46 and a second check valve 48, respectively. When the primary pilot supply pump 28 is providing pressurized pilot fluid, the first check valve 46 is open to provide the pilot fluid to the inlet port 44 and of the second check valve 48 is closed to prevent pressurized fluid from flowing back to the secondary pilot supply pump 34 and the secondary inlet port 24 of the pilot selector valve 12. Conversely, when the secondary pilot supply pump 34 supplies pressurized pilot fluid, the second check valve 48 opens to the inlet port 44 and the first check valve 46 closes to prevent backflow to the primary pilot supply pump 28 and the primary inlet port 22. A first outlet port 50 of the selector control valve 40 is fluidly connected to the pilot selector valve 12 to provide pressurized pilot fluid to move the valve spool between the 0% position and the 100% position. A second outlet port 52 is in fluid communication with the tank 30 to allow drainage in over pressure situations to prevent excess leakage of the pilot fluid.

In the normal position, the inlet port 44 of the selector control valve 40 is closed, and the first outlet port 50 is placed in fluid communication with the second outlet port 52 to allow the pressurized pilot fluid acting on the pilot selector valve 12 to drain to the tank 30 and allow the pilot selector valve 12 to return to the 0% position. As a control signal is provided to the solenoid actuator 42 of the selector control valve 40, a force is generated to move the selector control valve 40 toward an open position where the inlet port 44 is in fluid communication with the first outlet port 50 to provide the pressurized pilot fluid to move the valve spool of the pilot selector valve 12. The flow of the pilot fluid will increase proportionally as the signal to the solenoid actuator 42 increases. A feedback line 54 provides a downstream pressure signal from the first outlet port 50 to close the selector control valve 40 against the force provided by the solenoid actuator 42 during an over pressure situation to drain the pilot fluid to the tank 30.

Figure 2:
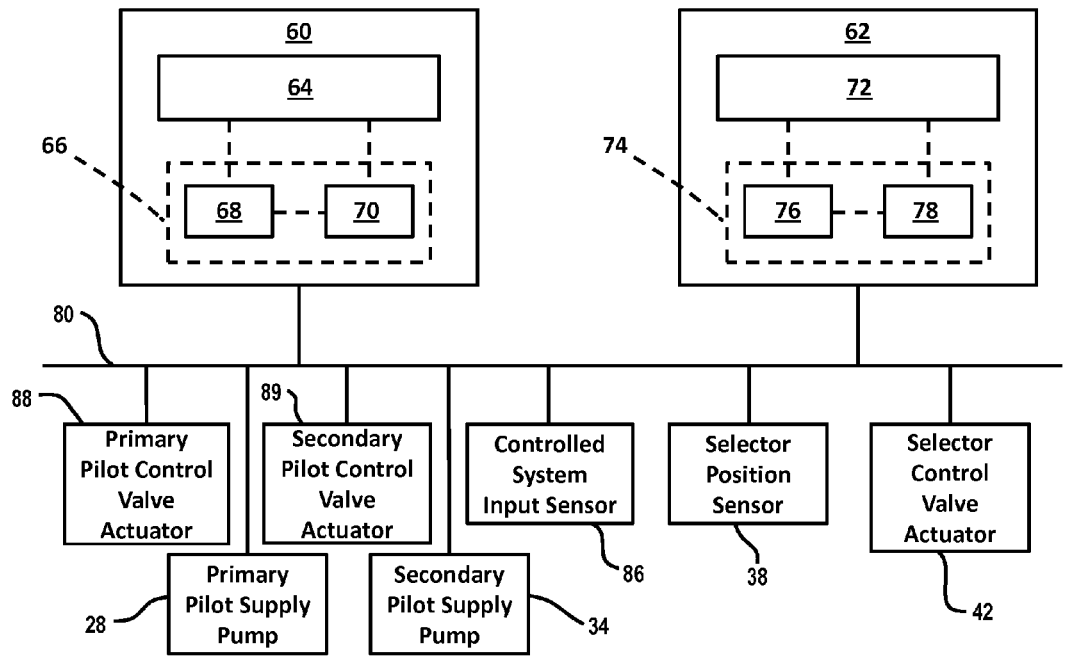
FIG. 2 is a schematic illustration of exemplary electronic control units and control components that may be implemented in the exemplary redundantly controlled system of FIG. 1.

The operation of the redundantly controlled system 10, the pilot selector valve 12, the pilot supply pumps 28, 34 and the selector control valve 40 may be monitored and controlled by one or more control units of the machine. FIG. 2 illustrates one example of a primary ECM 60 and a secondary ECM 62 that may be implemented in the machine to control the redundantly controlled system 10, the pilot selector valve 12, the pilot supply pumps 28, 34, the selector control valve 40 and, if desired, other systems of the machine. The ECM 60 may include a microprocessor 64 for executing a specified program, which controls and monitors various functions associated with the machine in general and with the redundantly controlled system 10 in particular. The microprocessor 64 includes a memory 66, such as read only memory (ROM) 68, for storing a program or programs, and a random access memory (RAM) 70 which serves as a working memory area for use in executing the program(s) stored in the memory 66. Although the microprocessor 64 is shown, it is also possible and contemplated to use other electronic components such as a microcontroller, an application specific integrated circuit (ASIC) chip, or any other integrated circuit device. In a similar manner, the secondary ECM 62 may include a microprocessor 72 for executing a specified program in conjunction with or as a replacement for the primary ECM 60, and a memory 74 that may include a ROM 76 and a RAM 78.

The ECM's 60, 62 may be electrically connected to the control elements of the redundantly controlled system 10, the pilot selector valve 12, the pilot supply pumps 28, 34 and the selector control valve 40, as well as various input devices for commanding the operation of the redundantly controlled system 10 and monitoring the performance of the redundantly controlled system 10, via direct connections or a communication bus 80. As a result, the ECM's 60, 62 are electrically connected to the pilot control valves 14, 16, the pilot supply pumps 28, 34, the selector position sensor 38 and the solenoid actuator 42 of the selector control valve 40 described above. The ECM's 60, 62 may be configured to transmit commands for actuating the pilot supply pumps 28, 34 and operating the pilot supply pumps 28, 34 at desired speeds, and to transmit commands for actuating the solenoid actuator 42 of the selector control valve 40 to open the selector control valve 40 to a position to provide pilot fluid to move the pilot selector valve 12 to a desired position. The ECM's 60, 62 may also be configured to receive signals transmitted by the selector position sensor 38 having values indicating a position of the valve spool of the pilot selector valve 12.

An appropriate controlled system input sensor(s) 86 may be electrically connected to the communication bus 80 for communication with the ECM's 60, 62. The controlled system input sensor(s) 86 may detect commands input by an operator at an appropriate input device of the machine, such as a steering wheel, joystick or tiller for a steering system, a brake pedal for a braking system, or the like, and transmit control signals indicative of the command input by the operator to the ECM's 60, 62 over the communication bus 80. In response to the control signals from the controlled system input sensor(s) 86, the ECM's 60, 62, or other control logic programmed therein, may generate and transmit control signals over the communication bus 80 to a primary pilot control valve actuator 88 and/or a secondary or redundant pilot control valve actuator 89 of the pilot control valves 14, 16, respectively, connected to the communication bus 80 to cause the redundantly controlled system 10 to execute the action commanded by the operator. As will be apparent to those skilled in the art, additional components of the redundantly controlled system 10 may be electrically connected to the ECM's 60, 62 for the exchange of control signals there between. The operation of the redundantly controlled system 10, the pilot selector valve 12 and the selector control valve 40 under the control of the ECM's 60, 62 are described in greater detail below. Though the communications are illustrated and described herein as being performed over a bus, those skilled in the art will understand that the communications may be performed using any appropriate communication interconnections between the ECM's 60, 62 and the controlled elements as discussed herein. Moreover, the control communications may include digital communications, analog communications or any appropriate combination thereof.

Figure 3:
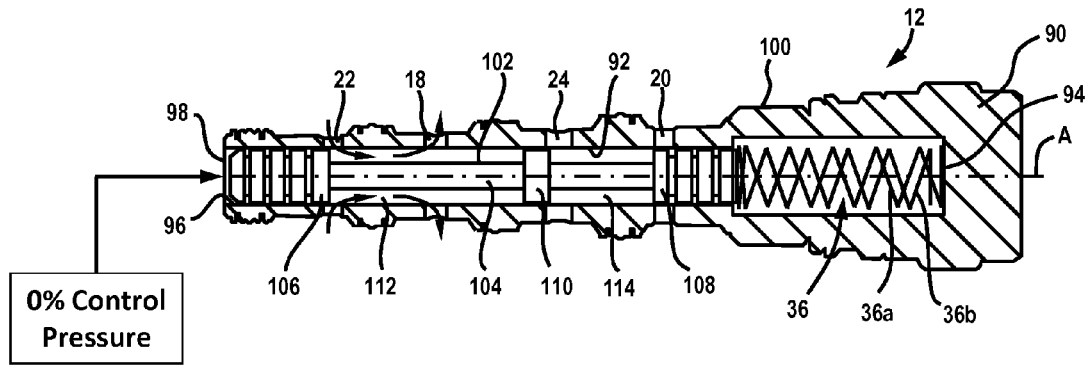
FIG. 3 is a cross-sectional view of the exemplary failsafe pilot supply selector valve of FIG. 1 in a 0% control pressure position.
Figure 4:
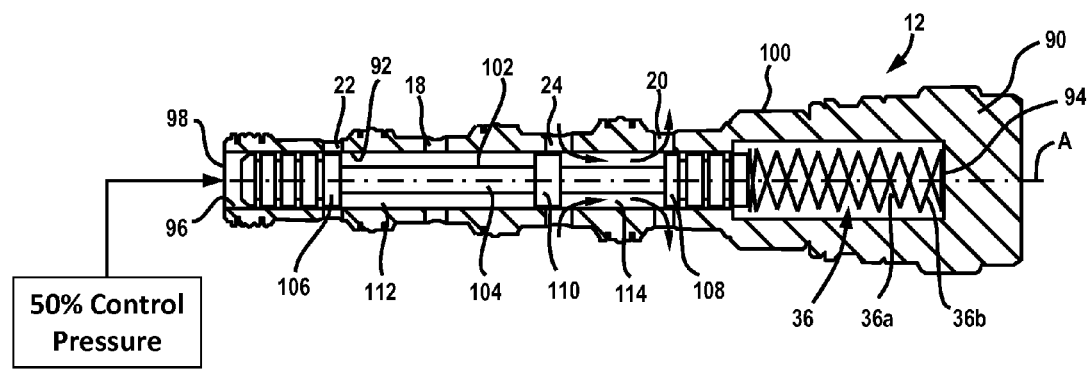
FIG. 4 is a cross-sectional view of the exemplary failsafe pilot supply selector valve of FIG. 1 in a 50% control pressure position.
Figure 5:
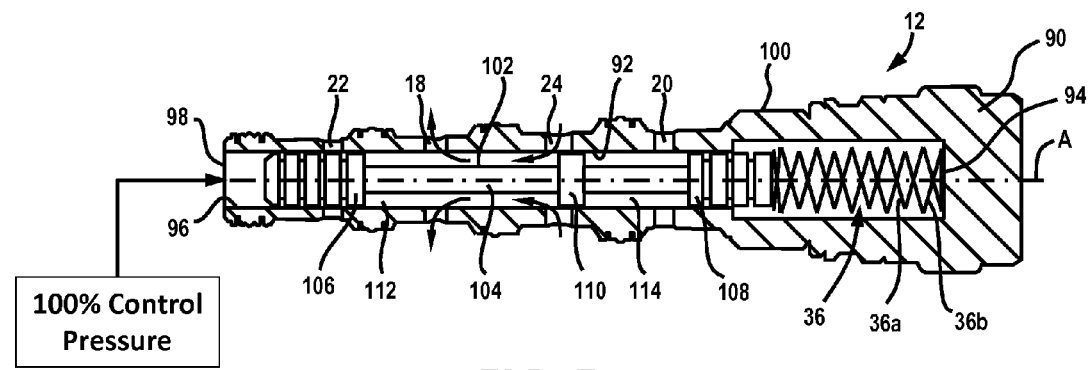
FIG. 5 is a cross-sectional view of the exemplary failsafe pilot supply selector valve of FIG. 1 in a 100% control pressure position.

Referring to FIGS. 3-5, one embodiment of a physical arrangement of the pilot selector valve 12 of FIG. 1 is shown in cross-section. As shown in FIG. 3, the pilot selector valve 12 has an outer valve housing 90 with a longitudinal axis A and an axial valve bore 92. The valve bore 92 may have a closed end 94 and an oppositely disposed open end 96 with a control pressure inlet 98 that may be placed in fluid communication with the first outlet port 50 of the selector control valve 40 to receive pressurized pilot fluid. Axially spaced along the valve housing 90 between the closed end 94 and the open end 96 of the valve bore 92, the inlet ports 22, 24 and the outlet ports 18, 20 extend through an outer surface 100 of the valve housing 90 to the valve bore 92 to place the valve bore 92 in fluid communication with the valve housing 90. As shown schematically in FIG. 1, the primary inlet port 22 will be placed in fluid communication with the primary outlet port 18 in the 100% position. Consequently, the primary inlet port 22 is disposed proximate or adjacent to the primary outlet port 18. Because the secondary inlet port 24 will be placed in fluid communication with the secondary outlet port 20 in the 50% position and with the primary outlet port 18 in the 100% position, the secondary inlet port 24 is disposed proximate or adjacent both outlet port 18, 20.

A valve spool 102 may be disposed within the valve bore 92 and be axially slidable therein. The valve spool 102 may include a longitudinal valve shaft 104 having an outer diameter that is smaller than an inner diameter of the valve bore 92 to create a gap there between for fluid flow. The valve spool 102 further includes a first end seal 106 mounted on an end proximate the open end 96, a second end seal 108 mounted thereto on an end proximate the closed end 94, and a divider seal 110 mounted thereon between the end seals 106, 108. The seals 106, 108, 110 may have outer diameters that are approximately equal to the inner diameter of the valve bore 92 so that substantially fluid-tight seals are formed there between while allowing the valve spool 102 to slide back and forth axially within the axial valve bore 92. The first end seal 106, the divider seal 110 and the portion of the wall defining the valve bore 92 disposed there between define a first fluid flow chamber 112, and the second end seal 108, the divider seal 110 and the portion of the wall disposed there between define a second fluid flow chamber 114.

As discussed above, the return spring 36 biases the pilot selector valve 12 to the 0% position. To provide the necessary biasing force, the return spring 36 may be disposed within the axial valve bore 92 between the closed end 94 and the second end seal 108. The return spring 36 is configured to cooperate with the selector control valve 40 so that the valve spool 102 is in the 100% position of FIG. 3 when no pilot fluid or low-pressure pilot fluid is supplied at the control pressure inlet 98, the valve spool 102 moves to the 50% position of FIG. 4 when pilot fluid is supplied at a 50% control pressure at the control pressure inlet 98, and the valve spool 102 moves to the 100% position of FIG. 5 wherein pilot fluid is supplied at a 100% control pressure at the control pressure inlet 98.

Figure 6:
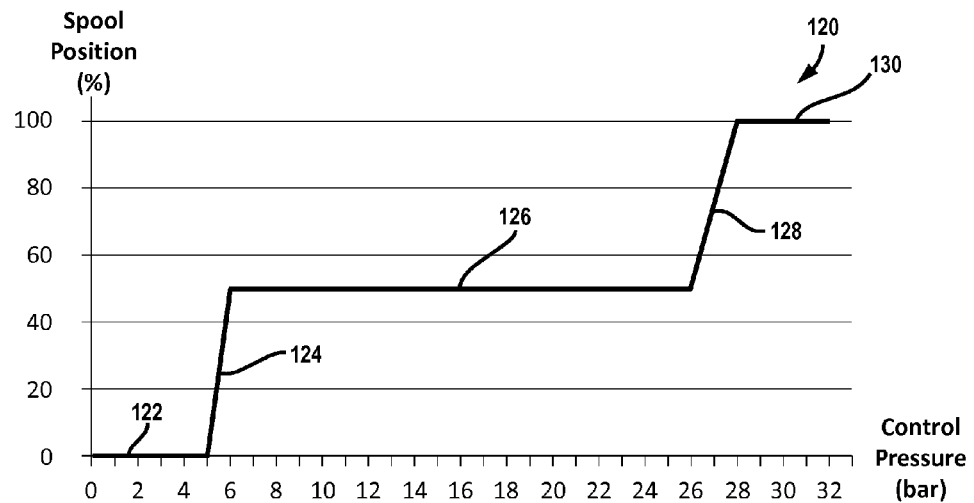
FIG. 6 is a graph of the control pressure versus spool position response of the failsafe pilot supply selector valve of FIG. 1.

In some implementations, the return spring 36 may provide a linear response to changes in the control pressure. In other implementations, a more complex response may be provided by varying the configuration of the return spring 36. For example, in the illustrated embodiment, the arrangement of the return spring 36 may include a first coil spring 36A and a second coil spring 36B that may create a controlled change in the position of the valve spool 102 in response to changes in the control pressure as shown in a graph 120 is shown in FIG. 6. The first coil spring 36A may be longer than the second coil spring 36B and engage the second end seal 108 when the valve spool 102 is in the 0% position. The length of the second coil spring 36B may be such that it does not engage both the closed end 94 of the valve bore 92 and the second and a seal 108 and provide a biasing force until the valve spool 102 moves to the 50% position. Once engaged, the second coil spring 36B may have a spring constant that, along with the biasing force of the first coil spring 36A, maintains the valve spool 102 at the 50% position until sufficient control pressure is applied at the control pressure inlet 98 to move the valve spool 102 to the 100% position.

In the embodiment shown in the graph 120 of FIG. 6, the first coil spring 36A may be configured with a spring constant that resists compression of the first coil spring 36A in a 0% position range 122 until the control pressure exceeds 5 bar. As the control pressure increases beyond 5 bar, the first coil spring 36A compresses and the valve spool 102 moves toward the 50% position of FIG. 4 over a first transition range 124 until the second coil spring 36B is engaged at the 50% position at approximately 6 bar. As the pressure continues to increase, the coil springs 36A, 36B maintain the 50% position of the valve spool 102 in a 50% position range 126 until the control pressure reaches approximately 26 bar. By providing a wide range of control pressures at which the valve spool 102 will remain in the 50% position, precise control of the pressure output by the selector control valve 40 is not required as would be required by a narrow 50% control pressure range. As the control pressure continues to increase beyond 26 bar, the biasing forces of the coil springs 36A, 36B are overcome to move the valve spool 102 to the 100% position through a second transition range 128 before reaching a 100% position range 130. Those skilled in the art will understand that the control pressures and corresponding response by the pilot selector valve 12 depicted by the graph 120 are exemplary. Other configurations and responses of the pilot selector valve 12 may be produced and are contemplated by the inventors as having use in pilot selector valves 12 in accordance with the present disclosure.

Returning to FIGS. 3-5, the inlet ports 22, 24, the outlet ports 18, 20 and the seals 106, 108, 110 are positioned to achieve the alternative flow paths shown schematically for the pilot selector valve 12 in FIG. 1. In the 0% position of FIG. 3, the primary inlet port 22 and the primary outlet port 18 are disposed between the first end seal 106 and the divider seal 110 so that the first fluid flow chamber 112 places the ports 18, 22 in fluid communication for pilot fluid from the primary pilot supply pump 28 to be provided to the primary pilot control valve 14. At the same time, the second end seal 108 blocks the secondary outlet port 20, and the divider seal 110 separates the secondary inlet port 24 from the ports 18, 22. In the 50% position of FIG. 4, the secondary or redundant flow path is established. The primary inlet port 22 is blocked by the first end the seal 106 and the divider seal 110 separates the primary outlet port 18 from the ports 20, 22. The secondary inlet port 24 and the secondary outlet port 20 are disposed between the second end seal 108 and the divider seal 110 so that the second fluid flow chamber 114 places the ports 20, 24 in fluid communication for pilot fluid from the secondary pilot supply pump 34 to be provided to the secondary pilot control valve 16. In the 100% position of FIG. 5, the first end seal 106 continues to block the primary inlet port 22, and the divider seal 110 separates the secondary outlet port 20 from the ports 18, 24. The secondary inlet port 24 and the primary outlet port 18 are disposed between the first end seal 106 and the divider seal 110 so that the first fluid flow chamber 112 places the ports 18, 24 in fluid communication for pilot fluid from the secondary pilot supply pump 34 to be provided to the primary pilot control valve 14. In designing the pilot selector valve 12 shown herein, it may be desirable to ensure that the pilot selector valve 12 will produce pilot fluid flow to the primary pilot control valve 14, the secondary pilot control valve 16, or both, at all positions of the valve spool 102. Such designs can prevent the pilot selector valve 12 from getting stuck in a position where pilot pressure is lost to both the primary pilot control valve 14 and the secondary pilot control valve 16, which can result in a loss of control of the mechanical elements of the system 10.

Figure 7:
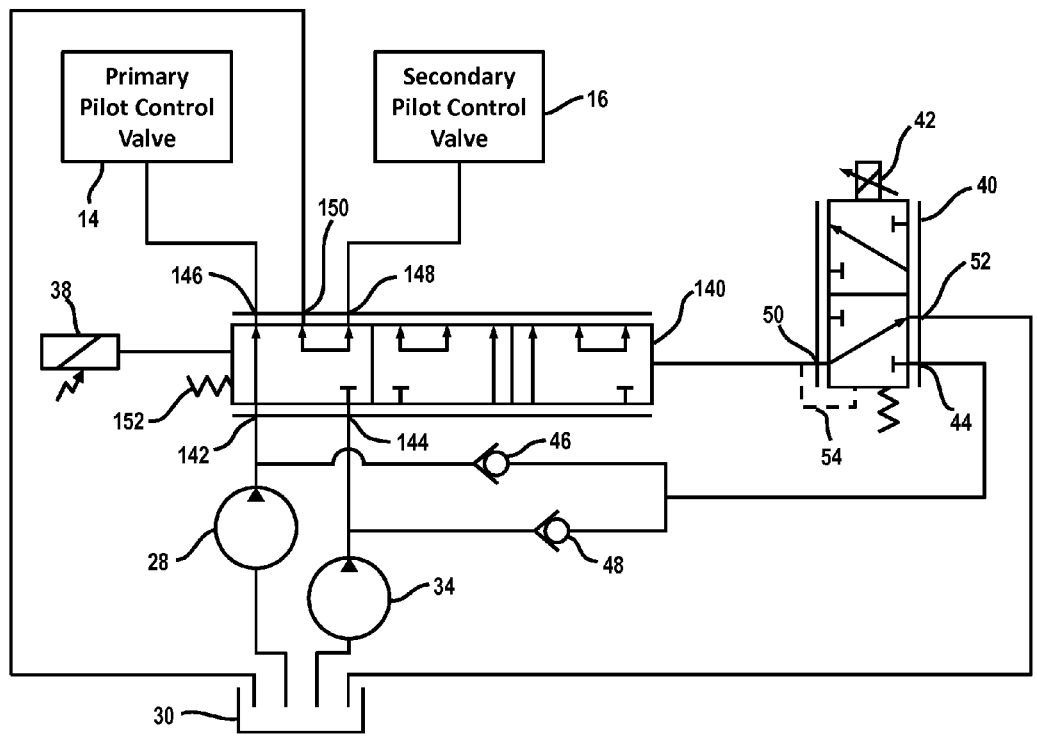
FIG. 7 is a schematic view of an alternative embodiment of a failsafe pilot supply selector valve in accordance with the present disclosure.

The pilot selector valve 12 is one example of a valve arrangement that may provide failsafe control over the supply of pilot fluid to the redundantly controlled system 10. FIGS. 7-10 illustrate one alternative embodiment of a failsafe pilot selector valve 140 in accordance with the present disclosure. Referring to FIG. 7, the pilot selector valve 140 may be substituted for the pilot selector valve 12 in the arrangement with the pilot control valves 14, 16, the pilot supply pumps 28, 34 and the selector control valve 40. In this embodiment, however, the pilot selector valve 140 may be a 5-way, 3-position valve having a first or primary inlet port 142 connected to the primary pilot supply pump 28, a second or secondary inlet port 144 connected to the secondary pilot supply pump 34, a primary outlet port 146 connected to the primary pilot control valve 14 and a secondary outlet port 148 connected to the secondary pilot control valve 16. The pilot selector valve 140 may also include a drain port 150 fluidly connected to the tank 30 to allow pilot fluid to drain from the one of the pilot control valves 14, 16 that is not connected to one of the pilot supply pumps 28, 34 depending on the position of the pilot selector valve 140.

A return spring 152 biases the pilot selector valve 140 to its 0% position where the primary pilot supply pump 28 is placed in fluid communication with the primary pilot control valve 14. The secondary inlet port 144 and, consequently, the secondary pilot supply pump 34 may be blocked, and the secondary outlet port 148 may be placed in fluid communication with the drain port 150 to allow pilot fluid in the secondary pilot control valve 16 to drain to the tank 30. The 100% position as shown may connect the ports 142, 144, 146, 148, 150 in the same manner so the primary pilot supply pump 28 provides pilot fluid to the primary pilot control valve 14. In the 50% position of the pilot selector valve 140, the secondary inlet port 144 is fluidly connected to the secondary outlet port 148 to place the secondary pilot supply pump 34 in fluid communication with the secondary pilot control valve 16, the primary inlet port 142 is blocked, and the secondary outlet port 148 is connected to the drain port 150 to drain the pilot fluid from the primary pilot control valve 14 to the tank 30.

Figure 8:
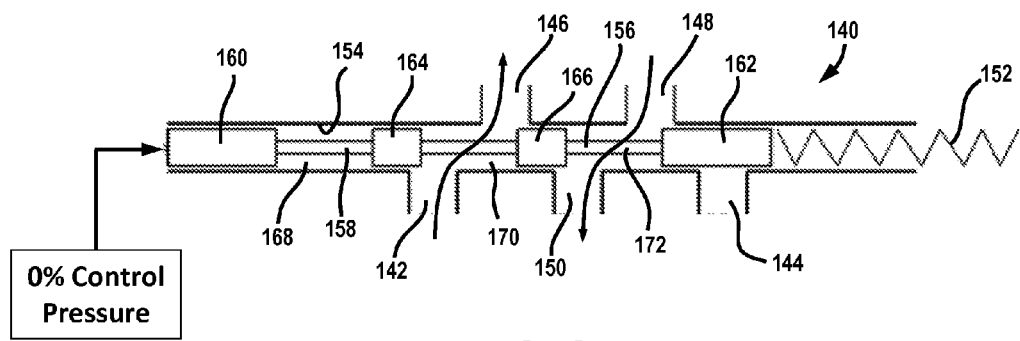
FIG. 8 is a schematic view of the exemplary failsafe pilot supply selector valve of FIG. 7 in a 0% control pressure position.
Figure 9:
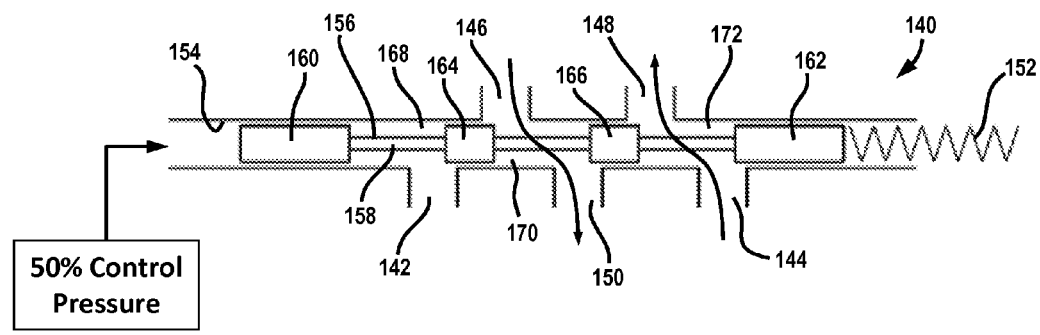
FIG. 9 is a schematic view of the exemplary failsafe pilot supply selector valve of FIG. 7 in a 50% control pressure position.
Figure 10:
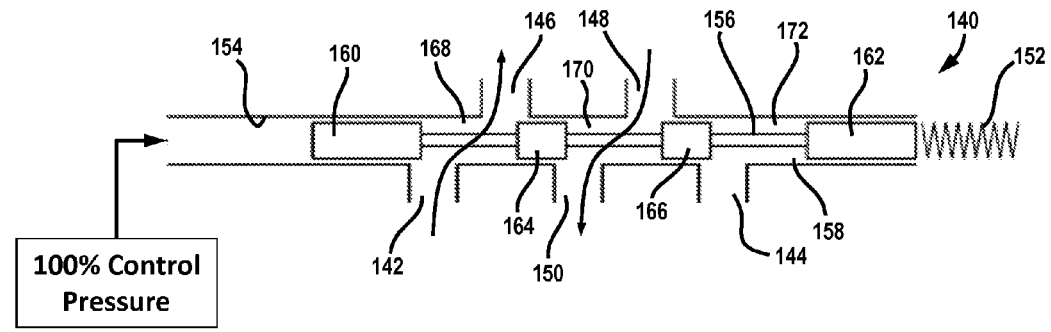
FIG. 10 is a schematic view of the exemplary failsafe pilot supply selector valve of FIG. 7 in a 100% control pressure position.

FIGS. 8-10 schematically illustrate the interaction between a valve bore 154 and a valve spool 156 of the pilot selector valve 140. The ports 142, 144, 146, 148, 150 extend through the valve bore 154 and are positioned relative to each other to be able to form the various fluid connections described above. For example, the inlet ports 142, 144 may be positioned proximate the corresponding outlet ports 146, 148, respectively, and the drain port 150 may be positioned between the outlet ports 146, 148. The valve spool 156 may include a valve spool shaft 158 having a first end seal 160 and an oppositely disposed second end seal 162, a first divider seal 164 and a second divider seal 166 disposed thereon and forming substantially fluid-tight seals with the valve bore 154 while allowing the valve spool 156 to slide back and forth in response to the forces applied by the return spring 152 and the control pressure. The first end seal 160 and the first divider seal 164 may form a first fluid flow chamber 168 there between, the divider seals 164, 166 may form a second fluid flow chamber 170 there between, and the second divider seal 166 and the second end seal 162 may form a third fluid flow chamber 172 there between.

When the valve spool 156 is in the 0% position of FIG. 8, the primary inlet port 142 and the primary outlet port 146 are disposed between the divider seals 164, 166 so that the first fluid flow chamber 168 allows fluid flow from the primary pilot supply pump 28 to the primary pilot control valve 14. At the same time, the secondary outlet port 148 and the drain port 150 are disposed between the second end seal 162 and the second divider seal 166 to drain the pilot fluid from the secondary pilot control valve 16 to the tank 30 through the third fluid flow chamber 172. The secondary inlet port 144 is blocked by the second end seal 162. Similar flow paths are established through the first fluid flow chamber 168 (primary inlet port 142 to primary outlet port 146) and the second fluid flow chamber 170 (secondary outlet port 148 to drain port 150) while the secondary inlet port 144 is blocked by the second divider seal 166 when the valve spool 156 is in the 100% position as shown in FIG. 10. In FIG. 9, the first divider seal 164 blocks the primary inlet port 142 as the third fluid flow chamber 172 forms a flow path between the secondary inlet port 144 and the secondary outlet port 148 and the second fluid flow chamber 170 forms a flow path between the primary outlet port 146 and the drain port 150.

Figure 11:
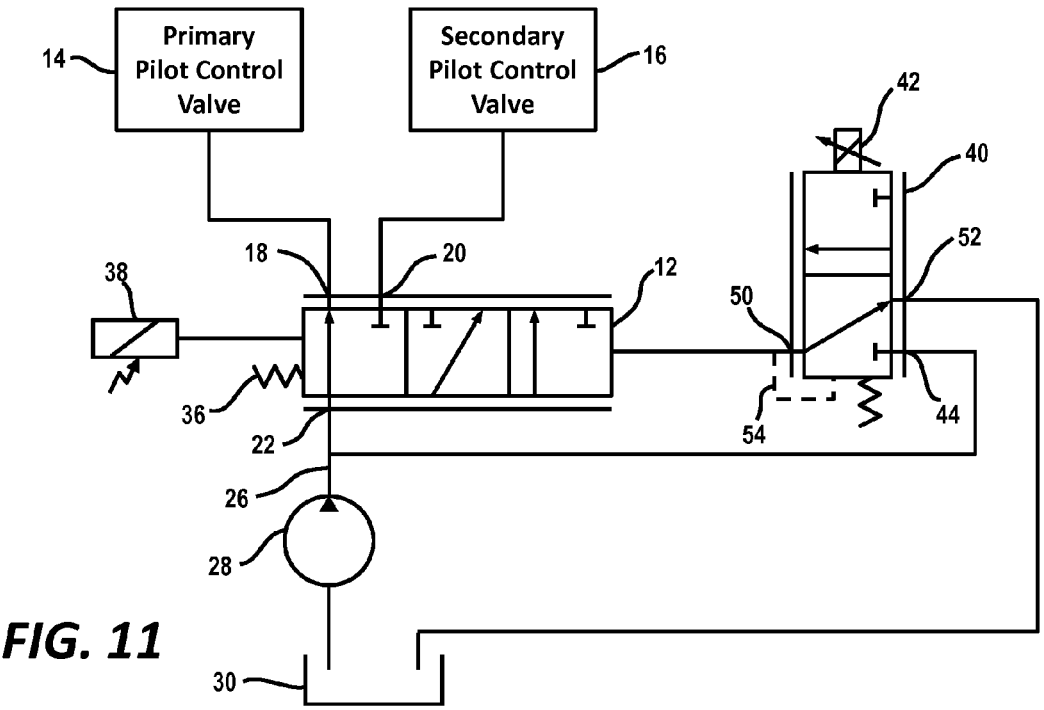
FIG. 11 is a schematic view of a further alternative embodiment of a failsafe pilot supply selector valve in accordance with the present disclosure.

Additional configurations of failsafe pilot selector valves may be implemented depending on the requirements and configuration of the redundantly controlled system 10 and the machine in which it is implemented. For example, FIG. 11 illustrates an implementation wherein only the primary pilot supply pump 28 is available to provide pilot fluid from the reservoir 30 to the pilot selector valve 12 and the selector control valve 40. In these implementations, the pilot selector valve 12 may be configured as a 3-way, 3-position valve that includes the primary inlet port 22 and the outlet ports 18, 20, and omits the secondary inlet port 24. In the 0% and the 100% positions, the primary inlet port 22 is fluidly connected to the primary outlet port 18, and the secondary outlet port 20 is blocked. In the 50% position, the pilot selector valve 12 is configured to fluidly connect the primary inlet port 22 to the secondary outlet port 20 to supply pilot fluid from the primary pilot supply pump 28 to the secondary pilot control valve 16, and to block the primary outlet port 18.

Figure 12:
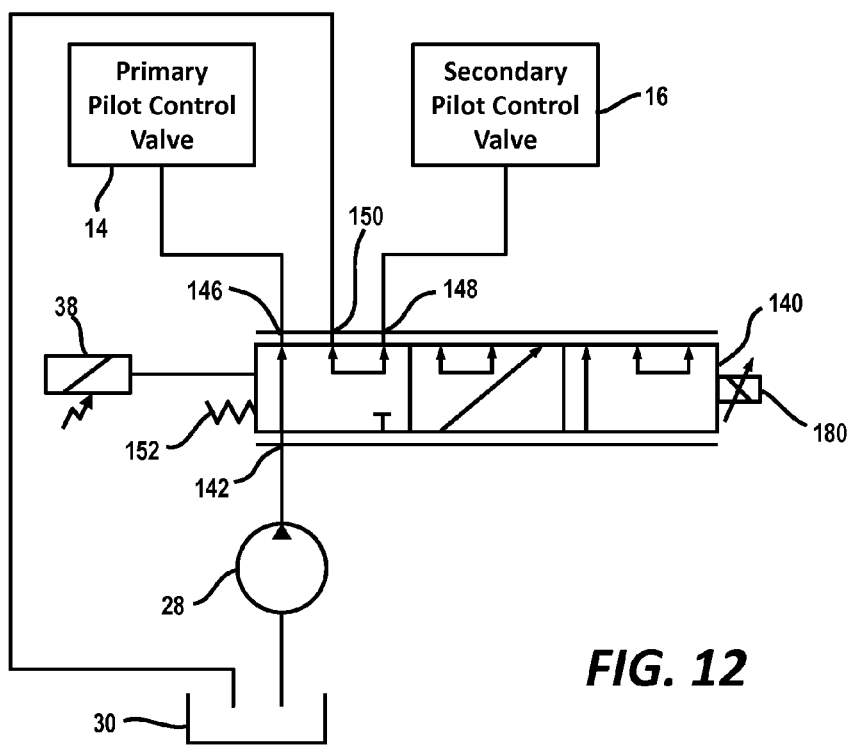
FIG. 12 is a schematic view of an additional alternative embodiment of a failsafe pilot supply selector valve in accordance with the present disclosure.

FIG. 12 illustrates an embodiment of the pilot selector valve 140 implemented in a machine having only the primary pilot supply pump 28. The pilot selector valve 140 in this embodiment may be a 4-way, 3-position valve having the primary inlet port 142, the outlet ports 146, 148 and the drain port 150. In the 0% and the 100% positions, the primary inlet port 142 is fluidly connected to the primary outlet port 146, and the secondary outlet port 148 is fluidly connected to the drain port 150. In the 50% position, the primary inlet port 142 is fluidly connected to the secondary outlet port 148, and the primary outlet port 146 is fluidly connected to the drain port 150. This embodiment also presents an alternative mechanism for manipulating the pilot selector valve 140 in the form of a solenoid actuator 180. The solenoid actuator 180 may be electrically connected to the communication bus 80 and receive control signals from the ECM's 60, 62 in a similar manner as the solenoid actuator 42 of the selector control valve 40 to actuate the solenoid actuator 180 as necessary to move the valve spool 156 between the 0%, 50% and 100% positions in the manner known in the art.

Those skilled in the art will understand that further alternative embodiments of the pilot selector valve may be designed to provide pilot fluid to the primary control elements of the redundantly controlled system 10 when the valve is in extreme or end positions, such as 0% and 100% positions, and provide pilot fluid to the secondary or redundant control elements in an intermediate position, such as a 50% position. Moreover, alternative mechanisms for actuating the pilot selector valve between the extreme or end positions and intermediate positions may be used. Such alternative pilot selector valve and a valve actuator designs are contemplated by the inventors as having use in providing fluid tube redundantly controlled systems in accordance with the present disclosure.

INDUSTRIAL APPLICABILITY

Figure 13:
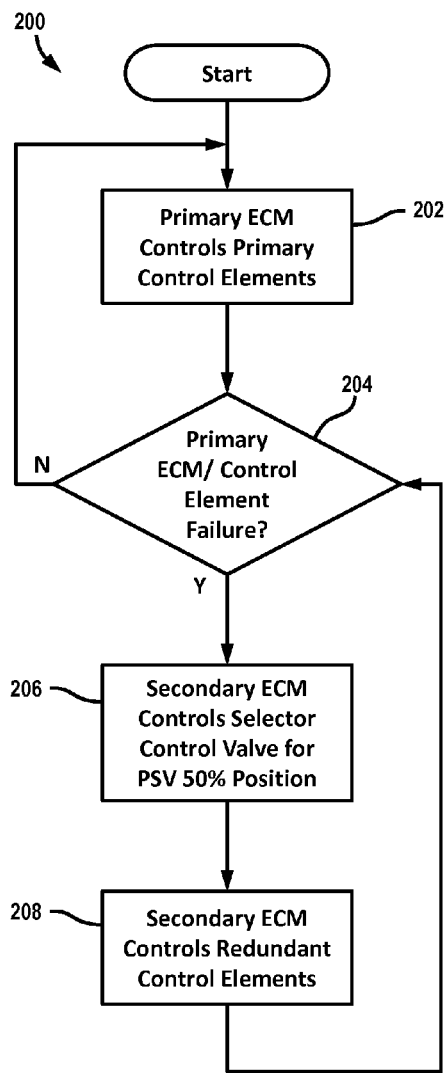
FIG. 13 is a flow diagram of an exemplary redundant control routine for the exemplary redundantly controlled system of FIG. 1.

During operation of the machine and the redundantly controlled system 10, the ECM's 60, 62 control the position of the implemented pilot selector valve to provide pilot fluid to the primary control elements of the system 10 during normal operation, and to provide pilot fluid to the redundant control elements of the system 10 when a fault condition occurs in the primary control elements or in the primary ECM 60. FIG. 13 illustrates one embodiment of a redundant control routine 200 that may be implemented by the ECM's 60, 62 with, for example, the machine configuration illustrated in FIGS. 1 and 2. Control of the redundant control routine 200 may begin at a block 202 where the primary ECM 60 controls the operation of the actuator 88 of the primary pilot control valve 14, among other elements of the system 10, to perform the functions of the system 10, such as braking, steering and the like. During the normal operation of the primary control elements of the system 10, the pilot selector valve 12 remains in the 0% position under the biasing force of the return spring 36 so the pressurized pilot fluid from the primary pilot supply pump 28 is provided to the primary pilot control valve 14. Consequently, the primary ECM 60 does not transmit control signals to the solenoid actuator 42 of the selector control valve 40, and the selector control valve 40 remains in its normal closed position of the pressurized pilot fluid is not provided to the control pressure inlet 98 of the pilot selector valve 12.

Control may pass to a block 204 where the ECM's 60, 62 may evaluate whether a failure occurs in either the primary ECM 60 or one of the primary control elements of the system 10. Errors can include valves not responding to control signals from the primary ECM 60, software malfunctioning in the primary ECM 60, and other failure conditions wherein the redundantly controlled system 10 fails to properly respond to the commands input by an operator of the machine. If no failures are detected, control may pass back to the block 202 for the primary ECM 60 to continue controlling the primary control elements of the system 10.

If a failure is detected at the block 204, control may pass to a block 206 wherein the secondary ECM 62 assumes control and transmits control signals to the solenoid actuator 42 to open the selector control valve 40 and cause the pilot selector valve 12 to move to the 50% position. As the selector control valve 40 opens, pilot fluid is provided and the control pressure at the control pressure inlet 98 increases to move the valve spool 102 to the 50% position so that the flow of pilot fluid to the primary pilot control valve 14 is cut off and pilot fluid is provided to the secondary pilot control valve 16. Detection of the failure also causes the secondary ECM 62 to assume control of the redundant control elements of the redundantly controlled system 10 at a block 208. The redundant elements may include the actuator 89 of the secondary pilot control valve 16, and other elements that perform control functions only upon failure of the primary control elements. At the same time, the secondary ECM 62 may control the elements of the redundantly controlled system 10 that do not have redundant replacements and operate continuously to perform the control functions of the system 10.

After the secondary ECM 62 begins performing the control functions for the redundantly controlled system 10, control passes back to the block 204 to determine if the failure in the primary ECM 60 or the primary control elements of the system 10 persists. As long as the failure continues, the secondary ECM 62 will continue to maintain the pilot selector valve 12 at the 50% position and control the functions of the redundantly controlled system 10. Once the failure in the system 10 is corrected and a failure is no longer detected at the block 204, control passes back to the block 202 where the primary ECM 60 resumes control of the control elements of the redundantly controlled system 10 and the control signals to the solenoid actuator 42 of the selector control valve 40 are discontinued so that the selector control valve 40 ceases providing pilot fluid to the control pressure inlet 98 and the pilot selector valve 12 returns to the 0% position under the biasing force of the return spring 36.

The redundant control routine 200 provides for the control of the redundantly controlled system 10 during normal operations, and for a smooth transition to the redundant control elements in the event of a failure in the primary control elements or the primary ECM 60. Despite this, it is possible for exceptional conditions to occur wherein the secondary ECM 62 may attempt to assume control of the system 10 without an actual failure in the redundantly controlled system 10. These conditions may occur, for example, due to software malfunctions in the secondary ECM 62 that may cause the secondary ECM 62 to attempt to perform control functions for the system 10 and control the operation of the selector control valve 40. In these situations, it may be necessary to detect the malfunctioning of the secondary ECM 62 and restore control of the system 10 to the primary ECM 60.

Figure 14:
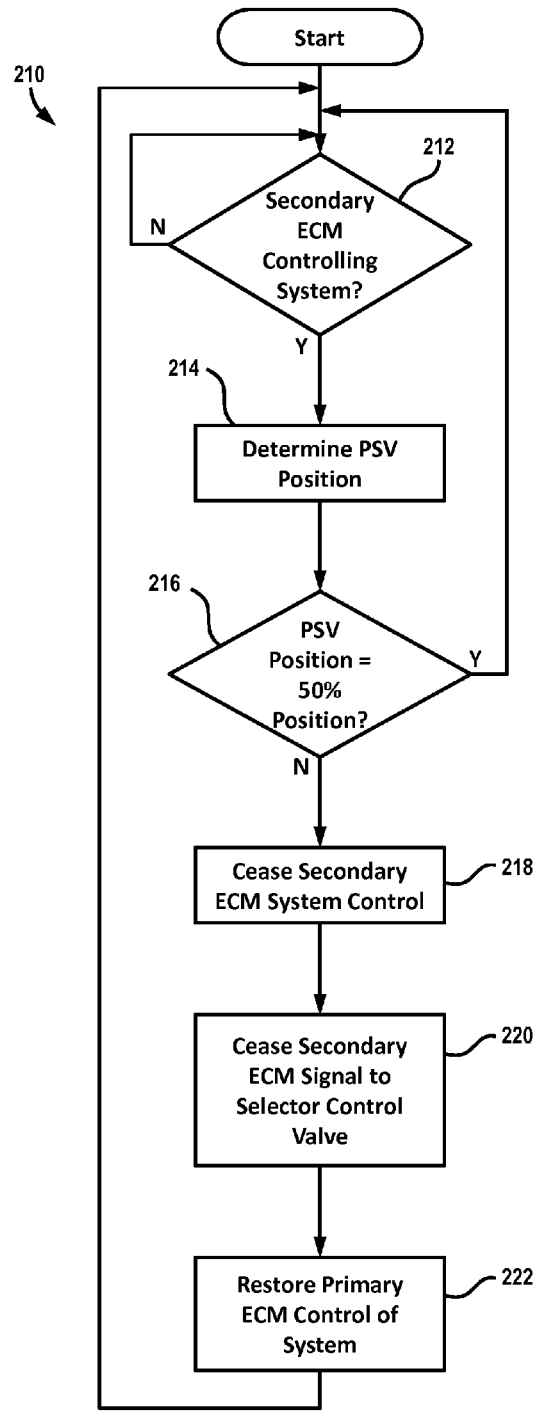
FIG. 14 is a flow diagram of an exemplary failsafe ECM operation routine for the exemplary redundantly controlled system of FIG. 1.

FIG. 14 illustrates one example of a failsafe ECM operation routine 210 that may detect malfunctioning of the secondary ECM 62 and restore control to the primary ECM 60. The failsafe ECM operation routine 210 may start at a block 212 where the primary ECM 60 and/or the secondary ECM 62 may determine whether the secondary ECM 62 is operating to control the redundantly controlled system 10. If the secondary ECM 62 is not controlling the operations of the system 10, the ECM's 60, 62 may continue to allow the primary ECM 60 control the system 10 and continue to monitor for a change over to control of the system 10 by the secondary ECM 62.

If the ECM's 60, 62 determine the secondary ECM 62 is controlling the system 10 at the block 212, control may pass to a block 214 where signals transmitted by the selector position sensor 38 are evaluated by one or both of the ECM's 60, 62 to determine the position of the pilot selector valve 12. In malfunction situations for the secondary ECM 62, the secondary ECM 62 either fails to issue control signals to the solenoid actuator 42 of the selector control valve 40 so that the pilot selector valve 12 remains in the 0% position, or transmits control signals to the solenoid actuator 42 causing the selector control valve 40 to fully open and provide pressurized pilot fluid to the control pressure inlet 98 of the pilot selector valve 12 that causes the pilot selector valve 12 to move to the 100% position. Because no actual failure is occurring in the control elements of the system 10 for the primary ECM 60, the design of the pilot selector valve 12 ensures that the primary pilot control valve 14 is supplied with pilot fluid in the extreme 0% and 100% end positions of the pilot selector valve 12.

After the position of the pilot selector valve 12 is determined at the block 214, control passes to a block 216 to determine if the pilot selector valve 12 is at the 50% position as would be expected when the secondary ECM 62 has assumed control in response to a failure in the redundantly controlled system 10. The comparison of the determined valve position to the 50% position may include an acceptable range about the 50% position within which the determined valve position may fall without indicating an issue with the secondary ECM 62 performing control functions to avoid false positive detections, such as ±1%, ±5%, ±10%, or other ranges including ranges that may encompass but may not be centered about the 50% position depending on the particular implementation. If the pilot selector valve 12 is at the 50% position or within the acceptable range used in the comparison, control passes back to the block 212 to allow the secondary ECM 62 to continue controlling the operation of the system 10 while continuing to monitor the operational status of the secondary ECM 62.

If the pilot selector valve 12 does not have an acceptable value for the 50% position as determined from the signals from the selector position sensor 38, control may pass to a block 218 wherein the secondary ECM 62 ceases controlling the elements of the redundantly controlled system 10. Because the secondary ECM 62 has not properly assumed control as a result of a failure in the primary control strategy, the secondary ECM 62 stops performing control functions so that the primary ECM 60 can resume control of the redundantly controlled system 10 as designed. Control may then pass to a block 220 wherein the secondary ECM 62 ceases transmitting control signals to the solenoid actuator 42 of the selector control valve 40 so that the selector control valve 40 returns to its closed position and, correspondingly, the pilot selector valve 12 returns to the 0% position is intended for normal control of the system 10. At that point, control may pass to a block 222 if necessary to restore control of the system 10 to the primary ECM 60. When control of the system 10 is restored to the primary ECM 60, control may pass back to the block 212 where the ECM's 60, 62 may resume evaluating for the secondary ECM 62 assuming control of the redundantly controlled system 10.

Figure 15:
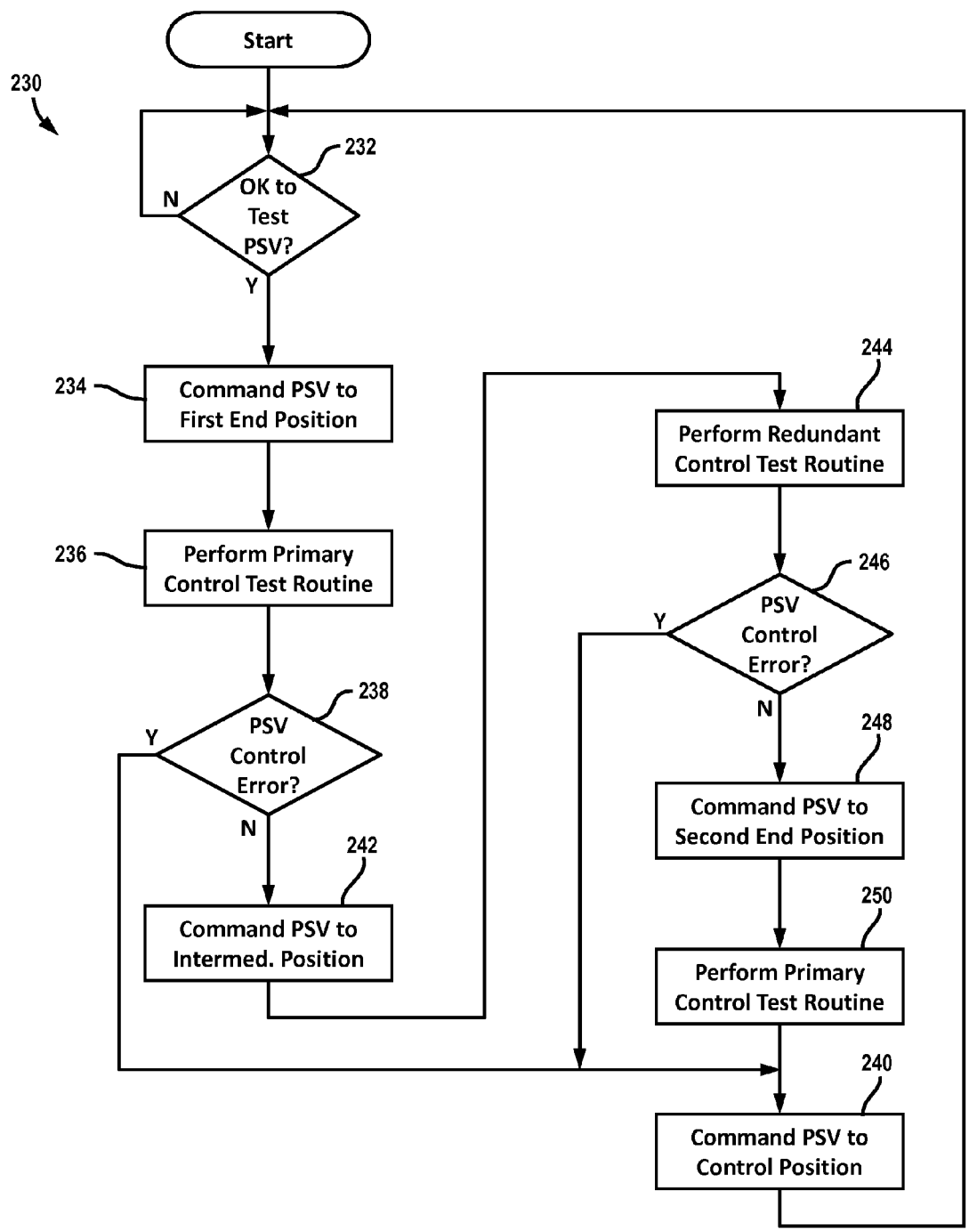
FIG. 15 is a flow diagram of an exemplary pilot selector valve test routine test routine for the exemplary redundantly controlled system of FIG. 1.

FIG. 15 illustrates an alternative pilot selector valve test routine 230 that may be implemented concurrently with or as an alternative to the failsafe ECM operation routine to ensure that the pilot selector valve 12 is operating correctly and that the ECM's 60, 62 are properly controlling the operation of the pilot selector valve 12. The test routine 230 may be executed periodically as necessary to test the pilot selector valve 12 when the operator is not issuing commands for the redundantly controlled system 10 to perform its function. Consequently, the test routine 230 may begin at a block 232 where the ECM's 60, 62 determine if the operating conditions are appropriate for testing the operation of the pilot selector valve 12. If the operator is issuing commands for the redundantly controlled system 10, the ECM's determine that the test routine 230 should not continue executing, and control passes back to the block 232 to wait for the next execution cycle of the test routine 230.

If the ECM's 60, 62 determine at the block 232 that commands are not being issued and conditions are appropriate for testing the pilot selector valve 12, control may pass to a block 234 where commands are issued by the ECM's 60, 62, or omitted depending on the configuration, to cause the pilot selector valve 12 to move to the first end position. As previously discussed, in this position the pilot selector valve 12 provides pilot fluid to the primary pilot control valve 14 and other primary elements, but stops the flow of pilot fluid to the secondary pilot control valve 16 and other secondary elements of the redundantly controlled system 10. Within the system 10, a main spool valve (not shown) receives pilot fluid from the pilot control valves 14, 16 to cause a valve element of the main spool valve to move back and forth and cause a corresponding movement of the controlled mechanical elements, such as the wheels in a steering system. With the pilot selector valve 12 in the first end position, transmission of control signals to the primary pilot control valve actuator 88 causes pilot fluid flow to the main spool valve and corresponding movement of the valve element. At the same time, transmission of control signals to the secondary pilot control valve actuator 89 is not expected to cause movement of the valve element since the secondary pilot control valve should not be receiving pilot fluid from the pilot selector valve 12.

With the pilot selector valve 12 commanded to the first end position at the block 234, control passes to a block 236 for execution of a primary control test routine that will be described in greater detail with reference to FIG. 16. The primary control test routine will test the redundantly controlled system 10 and the pilot selector valve 12 to determine whether the system 10 reacts as expected when commands are issued to the primary pilot control valve actuator 88, and that the system 10 does not respond when commands are issued to the secondary pilot control valve actuator 89 due to the absence of pilot fluid from the pilot selector valve 12.

After the primary control test routine executes at the block 236, control may pass to a block 238 to determine whether a pilot selector valve control error was detected and logged by the primary control test routine. If a control error was detected and logged by the primary control test routine, control may pass to a block 240 where commands are issued to move the pilot selector valve 12 to the previous control position at which the valve 12 was commanded before initiation of the test routine 230. The test routine 230 may execute when either primary control or redundant control is being executed by the system 10, and the pilot selector valve 12 may have been in any one of the end and intermediate positions. At the same time, the ECMs 60, 62 return to executing the previous control strategy for the system 10. After control is restored, control may pass back to the block 232 to wait for the next execution of the test routine 230 or for the detected error to be corrected. It should be noted at this point that the test routine 230 may be aborted and control restored during execution of the test routine 230 upon detection of operator commands to perform the functions of the redundantly controlled system 10.

If no pilot selector valve control errors were detected and logged by the primary control test routine, control may pass from the block 238 to a block 242 where commands are issued by the ECM's 60, 62 to cause the pilot selector valve 12 to move to the intermediate position where the pilot selector valve 12 provides pilot fluid to the secondary pilot control valve 16 and other secondary elements, but stops the flow of pilot fluid to the primary pilot control valve 14 and other primary elements of the system 10. With the pilot selector valve 12 in the intermediate position, transmission of control signals to the primary pilot control valve actuator 88 should not cause movement of the valve element of the main spool valve, while transmission of control signals to the secondary pilot control valve actuator 89 should cause pilot fluid flow to the main spool valve and corresponding movement of the valve element.

Figure 17:
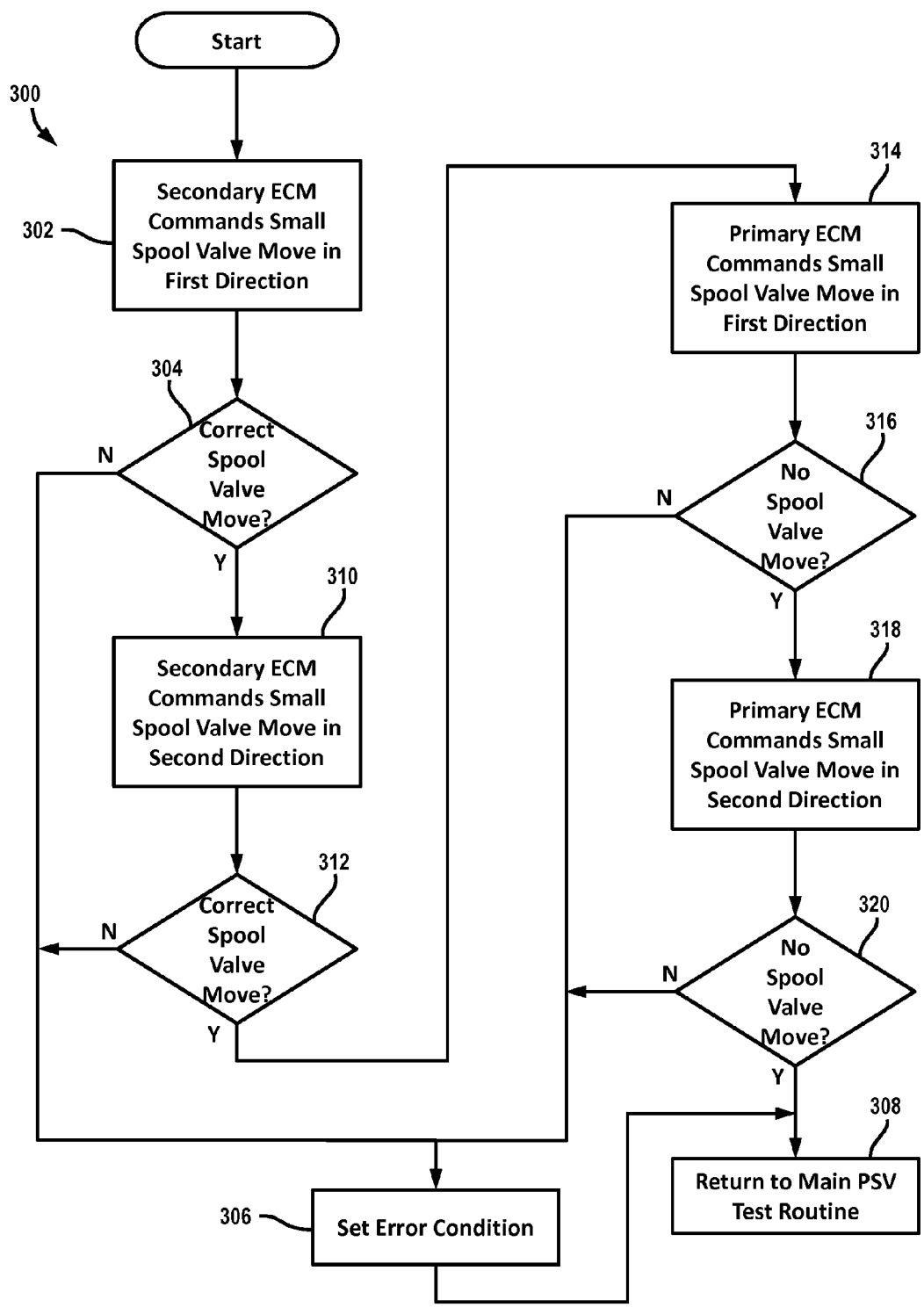
FIG. 17 is a flow diagram of an exemplary secondary control test routine for the exemplary pilot elector valve test routine of FIG. 15.

With the pilot selector valve 12 commanded to the intermediate position at the block 242, control passes to a block 244 for execution of a secondary control test routine that will be described in greater detail with reference to FIG. 17. The secondary control test routine will test the redundantly controlled system 10 and the pilot selector valve 12 to determine whether the system 10 reacts as expected when commands are issued to the secondary pilot control valve actuator 89, and that the system 10 does not respond when commands are issued to the primary pilot control valve actuator 88 due to the absence of pilot fluid from the pilot selector valve 12. After the secondary control test routine executes at the block 244, control may pass to a block 246 to determine whether a pilot selector valve control error was detected and logged by the secondary control test routine. In a similar manner as discussed above, control may pass to the block 240 to move the pilot selector valve 12 to the previous control position and resume control of the system 10 if a control error was detected and logged by the secondary control test routine.

If no pilot selector valve control errors were detected and logged by the secondary control test routine, control may pass from the block 246 to a block 248 where commands are issued by the ECM's 60, 62 to cause the pilot selector valve 12 to move to the second end position where, in a similar manner as the first end position, the pilot selector valve 12 provides pilot fluid to the primary pilot control valve 14 and other secondary elements, and stops the flow of pilot fluid to the secondary pilot control valve 16 and other secondary elements of the system 10. With the pilot selector valve 12 commanded to the second end position at the block 248, control passes to a block 250 to again execute the primary control test routine as discussed with regards to the block 236. After the primary control test routine executes at the block 250, control may pass to the block 240 to return to the previous control conditions and conclude the current execution of the pilot selector valve test routine 230.

Figure 16:
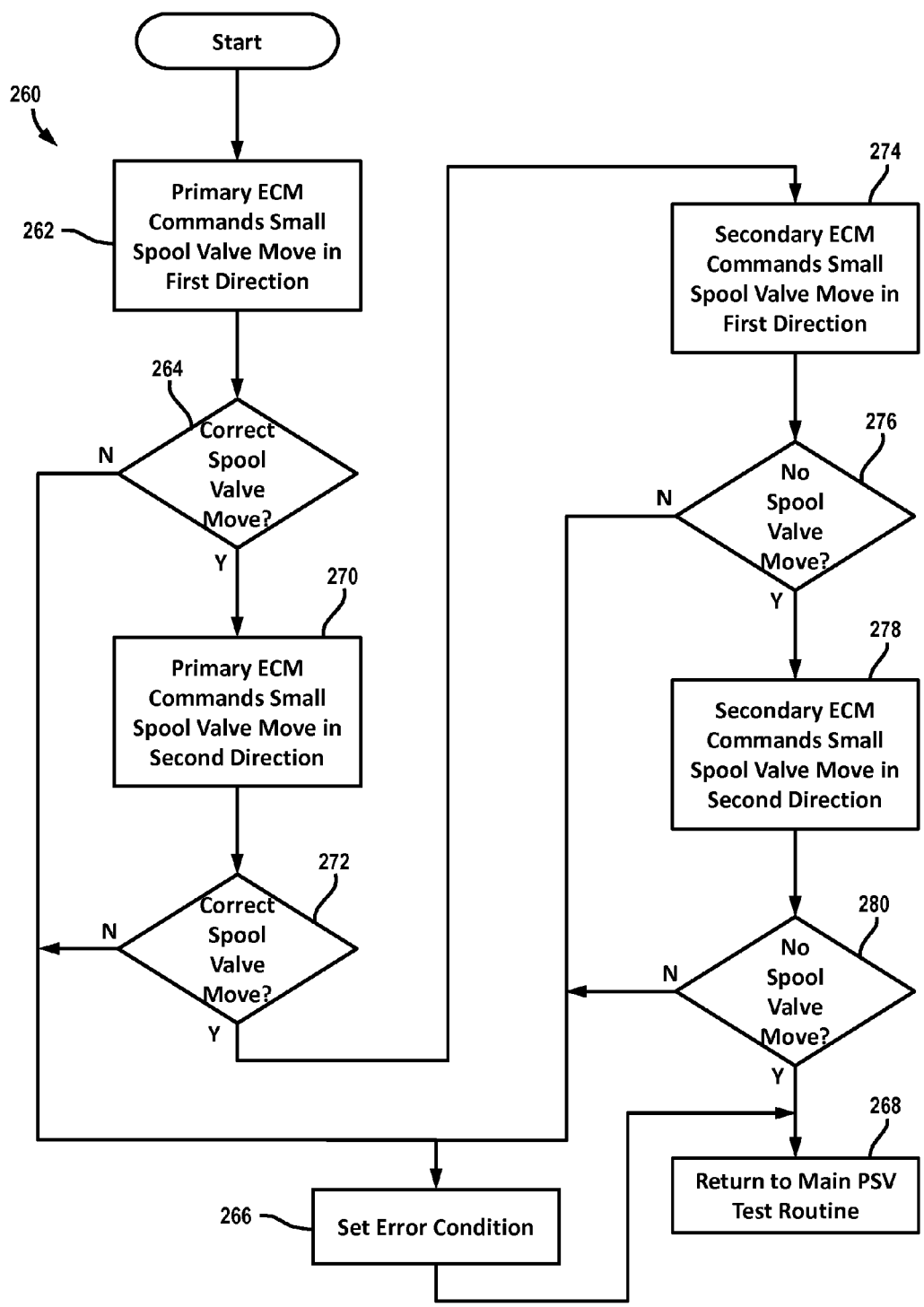
FIG. 16 is a flow diagram of an exemplary primary control test routine for the exemplary pilot elector valve test routine of FIG. 15.

FIG. 16 presents one example of a primary control test routine 260 that may be executed by the pilot selector valve test routine 230 at the blocks 236 and 250 to test the system 10 when the pilot selector valve 12 should be providing pilot fluid to the primary pilot control valve 14. The test routine 260 may begin at a block 262 where the primary ECM 60 transmits a command to the primary control elements of the system 10 that should cause a small movement of the valve element of the main spool valve in a first direction. The commanded amount movement of the valve element is measurable, but within a flow deadband movement range that will not change the fluid flow or the operational position of the mechanical elements of the system 10. The main spool valve may include a position sensor capable of measuring the movement of the valve element and transmit a signal indicative of the valve element position to the ECM's 60, 62.

After the movement of the valve element is commanded at the block 262 and sufficient time elapses for the commanded valve element movement, control may pass to a block 264 where the actual valve element position from the position sensor is compared to the commanded valve position to determine whether the spool valve moved by the commanded amount. If the actual valve element position is not equal to the commanded valve element position, control may pass to a block 266 where an error condition may be set. At the block 266, information pertaining to the detected error may be stored for use in diagnosing the issue causing the error. Other appropriate error handling logic may be executed as necessary for the detected error, such as executing appropriate diagnostics routines for further diagnosis of the error, outputting a sensory perceptible error notification for the operator of the machine, such as broadcasting an audible alarm, displaying an alphanumeric message or illuminating a warning light, and the like. Once the error condition setting logic has executed or is executing at the block 266, control may pass to a block 268 where control is returned to the pilot selector valve test routine 230 and the block 240 to resume the previous control state.

If the actual valve position at the block 264 is equal to the commanded valve position, the pilot selector valve 12 and the primary control elements operated properly to move the valve element to the commanded valve position. In this case, control may pass to a block 270 where the primary ECM 60 transmits a command to the primary control elements of the system 10 that should cause a small movement of the valve element in a second direction. This further movement may also be within the flow deadband. After the movement of the valve element is commanded at the block 270 and sufficient time elapses for the commanded valve element movement, control may pass to a block 272 where the actual valve element position from the position sensor is compared to the commanded valve position to determine whether the spool valve moved by the commanded amount in the second direction. If the actual valve element position is not equal to the commanded valve element position, control may pass to the block 266 to set an appropriate error condition as described above. It should be noted at this point that the logic of blocks 262, 264, 270, 272 may be skipped where the system 10 and the pilot selector valve 12 were operating under primary control with the pilot selector valve 12 in the first end position where the performance of the system 10 to control the main spool valve is constantly monitored.

If the actual valve position at the block 270 is equal to the commanded valve position, the pilot selector valve 12 and the primary control elements operated properly to move the valve element in the second direction to the commanded valve position. In this case, control may pass to a block 274 where the secondary ECM 62 transmits a command to the secondary control elements of the system 10 that should cause a small movement of the valve element in the first direction when the pilot selector valve 12 is supplying pilot fluid to the secondary pilot control valve 16. Because the pilot selector valve 12 has been commanded to one of the end positions, the secondary pilot control valve 16 should not be receiving pilot fluid, and the valve element is not expected to move. After the movement of the valve element is commanded at the block 274 and sufficient time elapses for the commanded valve element movement, control may pass to a block 276 where the actual valve element position from the position sensor is evaluated to determine whether the spool valve moved. If the actual valve element position has changed, an error is occurring and the pilot selector valve 12 is providing pilot fluid to the secondary pilot control valve 16. In this case, control may pass to the block 266 to set an appropriate error condition as described above.

If the actual valve position has not changed at the block 276, the pilot selector valve 12 is not providing pilot fluid to the secondary pilot control valve 16 as expected. In this case, control may pass to a block 278 where the secondary ECM 62 transmits a command to the secondary control elements of the system 10 that should cause a small movement of the valve element in the second direction. After the movement of the valve element is commanded at the block 278 and sufficient time elapses for the commanded valve element movement, control may pass to a block 280 where the actual valve element position from the position sensor is evaluated to determine whether the spool valve moved in the second direction. If the valve element position has changed, control may pass to the block 266 to set an appropriate error condition. If the valve element position has not changed, control may pass to the block 268 to return to the pilot selector valve test routine 230 without an error condition having been set.

The redundant control test routine of the block 244 of the pilot selector valve test routine 230 may operate in a generally similar manner to evaluate the operation of the system 10 and the pilot selector valve 12 when the secondary control elements are controlling the system with pilot fluid provided to the secondary pilot control valve 16 by the pilot selector valve 12. FIG. 17 illustrates one embodiment of the secondary control test routine 300 having a similar logic flow as the primary control test routine 260. The test routine 300 may begin at a block 302 where the secondary ECM 62 transmits a command to the secondary control elements that should cause a small movement of the valve element of the main spool valve in the first direction and within the flow deadband. After the movement of the valve element is commanded at the block 302 and sufficient time elapses for the commanded valve element movement, control may pass to a block 304 where the actual valve element position from the position sensor is compared to the commanded valve position to determine whether the spool valve moved by the commanded amount. If the actual valve element position is not equal to the commanded valve element position, control may pass to a block 306 where an error condition may be set in a similar manner as the block 266 as described above. Once the error condition setting logic has executed or is executing at the block 306, control may pass to a block 308 where control is returned to the pilot selector valve test routine 230 and the block 240 to resume the previous control state.

If the actual valve position at the block 304 is equal to the commanded valve position, the pilot selector valve 12 and the secondary control elements operated properly to move the valve element to the commanded valve position. In this case, control may pass to a block 310 where the secondary ECM 62 transmits a command to the secondary control elements that should cause a small movement of the valve element within the deadband in the second direction. After the movement of the valve element is commanded at the block 310 and sufficient time elapses for the commanded valve element movement, control may pass to a block 312 where the actual valve element position from the position sensor is compared to the commanded valve position to determine whether the spool valve moved by the commanded amount in the second direction. If the actual valve element position is not equal to the commanded valve element position, control may pass to the block 306 to set an appropriate error condition as described above. It should be noted that the logic of blocks 302, 304, 310, 312 may be skipped where the system 10 and the pilot selector valve 12 were operating under secondary control with the pilot selector valve 12 in the intermediate position where the performance of the system 10 to control the main spool valve is constantly monitored.

If the actual valve position at the block 310 is equal to the commanded valve position, the pilot selector valve 12 and the secondary control elements operated properly to move the valve element in the second direction to the commanded valve position. In this case, control may pass to a block 314 where the primary ECM 60 transmits a command to the primary control elements of the system 10 that should cause a small movement of the valve element in the first direction when the pilot selector valve 12 is supplying pilot fluid to the primary pilot control valve 14. Because the pilot selector valve 12 has been commanded to the intermediate position, the primary pilot control valve 14 should not be receiving pilot fluid, and the valve element is not expected to move. After the movement of the valve element is commanded at the block 314 and sufficient time elapses for the commanded valve element movement, control may pass to a block 316 where the actual valve element position from the position sensor is evaluated to determine whether the spool valve moved. If the actual valve element position has changed, an error is occurring and the pilot selector valve 12 is providing pilot fluid to the primary pilot control valve 14. In this case, control may pass to the block 306 to set an appropriate error condition as described above.

If the actual valve position has not changed at the block 316, the pilot selector valve 12 is not providing pilot fluid to the primary pilot control valve 14 as expected. In this case, control may pass to a block 318 where the primary ECM 62 transmits a command to the primary control elements of the system 10 that should cause a small movement of the valve element in the second direction. After the movement of the valve element is commanded at the block 318 and sufficient time elapses for the commanded valve element movement, control may pass to a block 320 where the actual valve element position from the position sensor is evaluated to determine whether the spool valve moved in the second direction. If the valve element position has changed, control may pass to the block 306 to set an appropriate error condition. If the valve element position has not changed, control may pass to the block 308 to return to the pilot selector valve test routine 230 without an error condition having been set.

While the routines 200, 210, 230 of FIGS. 13-15, respectively, have been discussed with reference to the system 10 and the pilot selector valve 12 illustrated and described with respect to FIGS. 1-6, those skilled in the art will understand that the routines 200, 210, 230 may be implemented with other failsafe selector control valves having end or extreme positions wherein pilot fluid is provided to the primary pilot control valve 14 and an intermediate position wherein pilot fluid is provided to the secondary pilot control valve 16, such as those illustrated and described in FIGS. 7-12. The pilot selector valves as illustrated and described herein provide failsafe operation against several potential different failure states that can be detected through the communications transmitted over the communication bus 80. The pilot selector valves provide pilot fluid to the primary pilot control valve 14 for the primary control elements when the system 10 is operating properly and the primary ECM 60 is controlling the operation of the system 10, and in situations where the secondary ECM 62 malfunctions and causes the pilot selector valve 12 to move to an extreme position. At the same time, in the event of a failure of the primary control elements or the primary ECM 60, the secondary ECM 62 can assume control of the system 10 and provide pilot fluid to and control the operation of the redundant control elements of the system 10.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A failsafe pilot selector valve, comprising:
   at least one inlet port comprising a first inlet port and a second inlet port;
   a first outlet port;
   a second outlet port, wherein the failsafe pilot selector valve has a first end position with the at least one inlet port in fluid communication with the first outlet port, a second end position with the at least one inlet port in fluid communication with the first outlet port, and an intermediate position between the first end position and the second end position with the at least one inlet port in fluid communication with the second outlet port; and
   a biasing element providing a biasing force to move the failsafe pilot selector valve to the first end position, wherein, when the failsafe pilot selector valve is in the first end position, the first inlet port is in fluid communication with the first outlet port, wherein, when the failsafe pilot selector valve is in the second end position, the first inlet port is in fluid communication with the first outlet port, and wherein, when the failsafe pilot selector valve is in the intermediate position, the second inlet port is in fluid communication with the second outlet port.

2. The failsafe pilot selector valve of claim 1, comprising a drain port, wherein, when the failsafe pilot selector valve is in the first end position, the second outlet port is in fluid communication with the drain port, wherein, when the failsafe pilot selector valve is in the second end position, the second outlet port is in fluid communication with the drain port, and wherein, when the failsafe pilot selector valve is in the intermediate position, the first outlet port is in fluid communication with the drain port.

3. The failsafe pilot selector valve of claim 1, comprising a valve actuator operable to move the failsafe pilot selector valve from the first end position to the intermediate position and to the second end position against the biasing force of the biasing element.

4. The failsafe pilot selector valve of claim 1, comprising a control pressure inlet configured to receive pressurized fluid so that the pressurized fluid received at the control pressure inlet can move the failsafe pilot selector valve from the first end position to the intermediate position and to the second end position against the biasing force of the biasing element.

5. A machine, comprising:
   a redundantly controlled system having a primary control element and a secondary control element;
   at least one pilot supply source outputting a pressurized pilot fluid, and comprising a first pilot supply source and a second pilot supply source;
   a failsafe pilot selector valve, comprising:
     at least one inlet port fluidly connected to the at least one pilot supply source comprising a first inlet port fluidly connected to the first pilot supply source and a second inlet port fluidly connected to the second pilot supply source,
     a first outlet port fluidly connected to the primary control element,
     a second outlet port fluidly connected to the secondary control element, wherein the failsafe pilot selector valve has a first end position with the at least one inlet port in fluid communication with the first outlet port, a second end position with the at least one inlet port in fluid communication with the first outlet port, and an intermediate position between the first end position and the second end position with the at least one inlet port in fluid communication with the second outlet port, wherein, when the failsafe pilot selector valve is in the first end position, the first inlet port is in fluid communication with the first outlet port, wherein, when the failsafe pilot selector valve is in the second end position, the first inlet port is in fluid communication with the first outlet port, and wherein, when the failsafe pilot selector valve is in the intermediate position, the second inlet port is in fluid communication with the second outlet port, and
     a biasing element providing a biasing force to move the failsafe pilot selector valve to the first end position; and
   a valve actuator operatively connected to the failsafe pilot selector valve and operable to move the failsafe pilot selector valve from the first end position to the intermediate position and to the second end position against the biasing force of the biasing element.

6. The machine of claim 5, comprising a fluid reservoir and the failsafe pilot selector valve comprises a drain port fluidly connected to the fluid reservoir, wherein, when the failsafe pilot selector valve is in the first end position, the second outlet port is in fluid communication with the drain port, wherein, when the failsafe pilot selector valve is in the second end position, the second outlet port is in fluid communication with the drain port, and wherein, when the failsafe pilot selector valve is in the intermediate position, the first outlet port is in fluid communication with the drain port.

7. The machine of claim 5, wherein the valve actuator comprises a solenoid actuator directly coupled to the failsafe pilot selector valve and operable to move the failsafe pilot selector valve from the first end position to the intermediate position and to the second end position against the biasing force of the biasing element.

8. The machine of claim 5, wherein the valve actuator comprises a selector control valve comprising:
   a first control valve inlet port fluidly connected to the at least one pilot supply source; and
   a first control valve outlet port, wherein the selector control valve has a normal closed position where the first control valve inlet port is not fluidly connected to the first control valve outlet port, wherein the selector control valve has a first open position where the first control valve inlet port is fluidly connected to the first control valve outlet port to output pressurize pilot fluid having a first control pressure, and wherein the selector control valve has a second open position where the first control valve inlet port is fluidly connected to the first control valve outlet port to output pressurize pilot fluid having a second control pressure, wherein the failsafe pilot selector valve comprises a control pressure inlet fluidly connected to the first control valve outlet port so that pressurized fluid received from the selector control valve at the control pressure inlet having the first control pressure moves the failsafe pilot selector valve to the intermediate position and the pressurized fluid received from the selector control valve at the control pressure inlet having the second control pressure moves the failsafe pilot selector valve to the second end position against the biasing force of the biasing element.

9. A failsafe pilot selector valve, comprising:
at least one inlet port comprising a first inlet port;
a first outlet port;
a second outlet port, wherein the failsafe pilot selector valve has a first end position with the at least one inlet port in fluid communication with the first outlet port, a second end position with the at least one inlet port in fluid communication with the first outlet port, and an intermediate position between the first end position and the second end position with the at least one inlet port in fluid communication with the second outlet port;
a biasing element providing a biasing force to move the failsafe pilot selector valve to the first end position, wherein, when the failsafe pilot selector valve is in the first end position, the first inlet port is in fluid communication with the first outlet port, wherein, when the failsafe pilot selector valve is in the second end position, the first inlet port is in fluid communication with the first outlet port, and wherein, when the failsafe pilot selector valve is in the intermediate position, the first inlet port is in fluid communication with the second outlet port; and
a drain port, wherein, when the failsafe pilot selector valve is in the first end position, the second outlet port is in fluid communication with the drain port, wherein, when the failsafe pilot selector valve is in the second end position, the second outlet port is in fluid communication with the drain port, and wherein, when the failsafe pilot selector valve is in the intermediate position, the first outlet port is in fluid communication with the drain port.

10. The failsafe pilot selector valve of claim 9, comprising a valve actuator operable to move the failsafe pilot selector valve from the first end position to the intermediate position and to the second end position against the biasing force of the biasing element.

11. The failsafe pilot selector valve of claim 9, comprising a control pressure inlet configured to receive pressurized fluid so that the pressurized fluid received at the control pressure inlet can move the failsafe pilot selector valve from the first end position to the intermediate position and to the second end position against the biasing force of the biasing element.

* * * * *